March 17, 1925.
H. W. JOHNSTONE ET AL
1,530,371
RODENT, VERMIN, AND FUNGUS EXTERMINATOR
Filed March 3, 1924
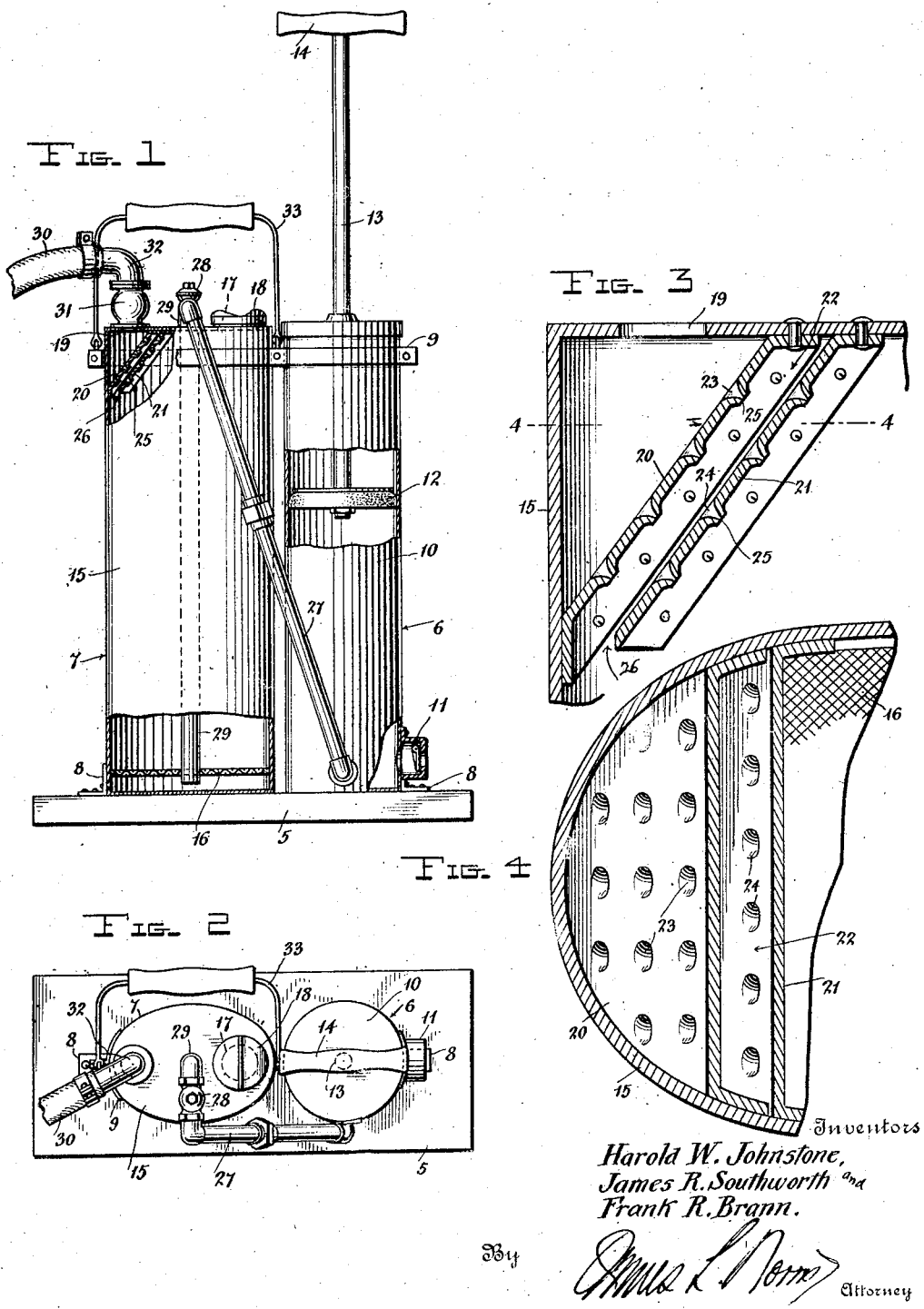
Inventors
Harold W. Johnstone,
James R. Southworth and
Frank R. Brann.
By
Attorney Patented Mar. 17, 1925.

1,530,371

UNITED STATES PATENT OFFICE.

HAROLD W. JOHNSTONE, JAMES R. SOUTHWORTH, AND FRANK R. BRANN, OF VISALIA, CALIFORNIA.

RODENT, VERMIN, AND FUNGUS EXTERMINATOR.

Application filed March 3, 1924. Serial No. 696,697.

*To all whom it may concern:*

Be it known that we, HAROLD W. JOHNSTONE, JAMES R. SOUTHWORTH, and FRANK R. BRANN, citizens of the United States, residing at Visalia, in the county of Tulare and State of California, have invented new and useful Improvements in Rodent, Vermin, and Fungus Exterminators, of which the following is a specification.

This invention relates to rodent, vermin, and fungus exterminators, and the primary object of the same is to provide a comparatively simple organization of parts whereby air under pressure may be forced through a volatile liquid to form a noxious gas, which is applied to the burrows of rodents, crevices and other places of lodgment of vermin generally and to surfaces and locations of fungus growths for the purpose of killing or destroying animal and fungus life in an expeditious and effective manner. A further object of the invention is to provide a rodent, vermin, and fungus exterminator or destroying means of a portable character comprising components of a simple form that may be readily associated in operative relation at a comparatively small cost and easily operated to effect the purpose for which it has been devised.

With these and other objects and advantages in view, the invention consists in the preferred construction and arrangement of the several parts which will be more fully hereinafter described and claimed.

In the drawing:

Fig. 1 is a side elevation of an exterminator embodying the features of the invention and showing parts thereof broken away to illustrate the interior construction of the same;

Fig. 2 is a top plan view of the exterminator;

Fig. 3 is an enlarged detail sectional view of the upper portion of the tank, showing a particular arrangement of baffles forming part of the invention; and Fig. 4 is a horizontal section on the line 4—4, Fig. 3.

The numeral 5 designates a base of suitable dimensions having an air pump or compressor 6 and a tank 7 suitably secured thereon in close relation, the specific means shown for the purpose of illustration for securing the pump or compressor and tank on the base being in the form of angular brackets or securing devices 8 and an upper connecting strap 9 having portions thereof embracing the pump and compressor and tank so as to hold these essential features of the invention in close associated relation.

The air pump or compressor 6 is of the usual type and comprises in the present instance an upright cylinder 10 of considerable capacity with a lower air inlet check valve 11, a piston 12 and a piston rod 13 extending through the top of the cylinder 10 and provided with a suitable handle 14. The tank 7 includes a cylinder 15 of greater dimensions than the cylinder 10 of the air pump or compressor 6 and is closed at the top and bottom as shown and near the bottom is provided with a screen partition 16. The top of the tank 15 has a suitable filling inlet 17 formed therein at one side of the center and provided with a winged closure cap 18. At a diametrically opposite point the top of the cylinder 15 has an outlet opening 19 and below this opening at a suitable distance therefrom are baffle plates 20 and 21 arranged at an angle of inclination and in parallel relation with a space 22 between them. The baffle plate 20 is of greater extent than the baffle plate 21 and both have inwardly punctured openings 23 and 24 with the metal or material of the plates around the openings projected, as at 25, on the lower sides. These openings 23 and 24 diverge towards the upper sides of the plates and the shorter or bottom plate 21 permits a drainage outlet 26 to be formed between the lower ends of the plate. The plates are both secured to the side and top of the upper portion of the tank cylinder 15 and the purpose of the same is to prevent liquid from being driven out through the outlet or vent 19 with the gas formed by the air forced into the cylinder 15 of the tank in a manner which will be presently explained.

The tank 7 is preferably elliptical in contour as shown by Fig. 2, and between the bottom of the cylinder 10 of the air pump or compressor 6 and the top of the cylinder 15 of the tank 7 a pipe 27 is interposed and constitutes an air delivering pipe and connects above the top of the tank with a check valve 28, the pipe 27 being continued from the check valve downwardly through the cylinder 15 of the tank 7 by a branch 29 which has its lower end terminating below the screen partition 16 and above the bottom of the cylinder 15. The check valve 28 prevents the liquid from the tank or cylinder 15 from being drawn into the air pump during the upstroke of the piston 12 of the latter. A flexible tube or hose 30 is connected to the top of the cylinder 15 of the tank, or has communication with the outlet or vent opening 19, a check valve 31 preferably of the ball type being interposed between the outlet or vent opening 19 and the flexible tube or hose 30, the latter being attached by suitable means to a branch connection 32 turned at an angle from and forming part of the check valve 31, and whereby the said tube or hose 30 may be more conveniently manipulated in applying the noxious gas forced outwardly from the cylinder 15 of the tank.

For rendering the exterminator as a whole readily portable, a suitable bail or handle 33 is attached to the top of the cylinder 15, and by this means the exterminator may be conveniently positioned adjacent the desired point of application of the noxious gas produced in the exterminator. The check valve 31 prevents fire reaching the liquid in the cylinder or chamber 15 of the tank and thereby avoiding explosion.

A volatile liquid is introduced in the cylinder or chamber 15 of the tank 7 through the inlet 17, and as one illustration, this liquid may be carbon-bisulphate but it will be understood that any other chemical may be used that will have the desired exterminating effect. In the use of the device the air pump is operated by air forced from the lower end of the pump upwardly through the pump or air line 27 downwardly into and through the branch 29, passing the check valve 28 in its course, and the air under pressure introduced at the bottom of the cylinder 15 below the screen partition or baffle 16 is caused to be distributed or forced upwardly through the liquid in the cylinder 15 in the form of small bubbles, so as to more effectively set up an absorption of the chemical within the cylinder 15 and production of the gas desired. At the time this operation begins the flexible tube or hose 30 is applied in the burrow of the rodent or to other places where it is proposed to destroy vermin or fungus growths, and the gas passes out through the baffle plates 21 and 20, the openings 23 and 24 of said plates being staggered as shown, or the openings 24 of the plate 21 disposed opposite the closed portions between the openings 23 of the plate 20. to insure retention of all the liquid within the cylinder 15 and the escape only of the gas through the outlet or vent 19 and check valve 31 into the tube or pipe 30.

The improved exterminator will be found exceptionally useful, and it is proposed to modify the dimensions and proportions of the same as may be found desirable without departing from the spirit of the invention. It will also be understood that suitable materials will be used in the construction of the pump and tank cylinders and that the piston 12 will be of the usual type.

What is claimed as new is:

1. An exterminator of the class specified, comprising an air pump, a liquid containing tank having a lower perforate partition and an upper outlet with spaced apertured baffle plates arranged at an inclination below the outlet, and an air pipe connection between the lower portion of the pump and the top of the tank and continued downwardly into the latter and terminating below the said perforate partition to produce a noxious gas which is expelled through the outlet.

2. An exterminator of the class specified, comprising an air pump, a liquid containing tank having a lower perforate partition therein and an upper outlet including a flexible hose and a check valve together with inclined perforated baffle plates arranged in spaced relation within the tank and below the said outlet, the perforations of one baffle plate being in staggered relation to those of the remaining plate, and an air pipe connecting the bottom of the air pump with the tank and having a branch extending downwardly into the tank and terminating below the perforate partition, the several parts being connected and supported for portable use.

3. An exterminator of the class specified, comprising an air pump, a liquid containing tank having a perforate partition in the lower portion thereof above the bottom of the same and extending fully and connected to the inner surface of the wall of the containing tank, a top outlet for the containing tank, and an air line connection consisting of a pipe extending from the bottom of the pump to the top of the tank and downwardly through the latter and terminating below the perforate partition to distribute the air through the contents of the tank in the form of bubbles for more effectively forming a noxious gas which is forced out of the top outlet of the tank.

4. An exterminator of the class specified, comprising a pump, a tank containing a liquid of a carbon-bisulphide nature and having a top outlet and a bottom perforate partition, an air pipe extending from the bottom of the pump to the top of the tank and then downwardly through the latter and terminating below the perforate partition and above the bottom of the tank, the air pipe having a check valve therein to prevent drawing of the contents of the tank into the pump, spaced perforate baffle plates in the upper portion of the tank below the outlet and at an angle relatively to the tank, the one plate being shorter than the other to provide for a lower discharge outlet between the plates, the plates having perforations in staggered relation, and an outlet connection including a check valve open to the outlet at the top of the tank.

In testimony whereof we have hereunto set our hands.

HAROLD W. JOHNSTONE.
JAMES R. SOUTHWORTH.
FRANK R. BRANN.